June 9, 1925. 1,541,125

J. H. DUNN

AUTOMOBILE TIRE VALVE

Filed Aug. 30, 1924

J. H. Dunn
Inventor.

Patented June 9, 1925.

1,541,125

UNITED STATES PATENT OFFICE.

JAMES H. DUNN, OF BECKLEY, WEST VIRGINIA.

AUTOMOBILE TIRE VALVE.

Application filed August 30, 1924. Serial No. 735,223.

*To all whom it may concern:*

Be it known that I, JAMES H. DUNN, a citizen of the United States, residing at Beckley, in the county of Raleigh and State of West Virginia, have invented a new and useful Automobile Tire Valve, of which the following is a specification.

The invention relates to an automobile tire valve, and consists of novel features, hereinafter described and claimed.

The object of the invention is to blow out dust and stagnant acid containing air from a tire before inflating same, this operation being made possible by keeping the valve on the side of valve body open until the dust and stagnant acid containing air is expelled from the tire before starting to inflate the tire.

Figure 1:
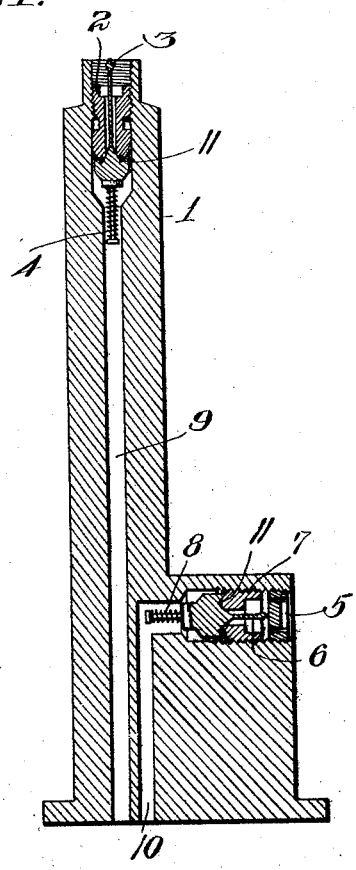
Figure 2:
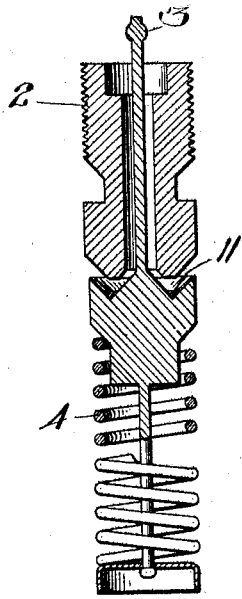
Figure 3:
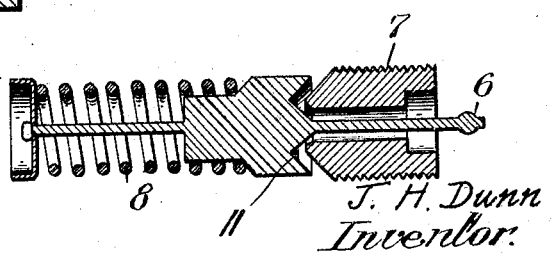

The form of the invention is illustrated in the drawing hereto attached, in which Figure 1 is a vertical section of the entire machine; Figure 2 is an enlarged view of valve at top; Figure 3 is an enlarged view of outlet valve.

The new valve comprises a body, Figure 1, through which an intake channel runs from top to bottom, 9, of valve body and an outlet, 10.

The intake valve, Figure 2, consists of a valve body, with valve seat, a valve and stem, 3, a spring, 4, and rubber gaskets, 11.

The outlet valve, Figure 3, consists of a valve body 7, with valve seat, a valve and stem, 6, a spring, 8, rubber gaskets, 11, and a perforated nut, 5.

The operation of blowing out dust and foul air from the tire is accomplished in the following manner:

Before attaching air line to intake valve screw down perforated nut 5 until valve is forced from seat, then attach your air line and start blowing-out process.

When ready to inflate turn screw out perforated nut 5 until same is flush with valve body, permitting valve to seat.

I claim:

In a tire valve structure, a body including a longitudinally extending bore extending from end to end of the body, an enlargement formed laterally of the inner end of the body, an angular shaped bore extending from the inner end of the body through the enlargement, a tire valve in the outer end of the first mentioned bore, a tire valve in the outer end of the second mentioned bore, and a perforated nut threaded in the outer end of the second mentioned bore for releasing the valve therein.

J. H. DUNN.